United States Patent [19]
Rogers et al.

[11] Patent Number: 4,875,770
[45] Date of Patent: Oct. 24, 1989

[54] WIND SHEAR DETECTOR

[75] Inventors: Philip L. Rogers, Granada Hills, Calif.; Milton Rogers, Baltimore, Md.

[73] Assignee: Lockheed Corporation, Calarasas, Calif.

[21] Appl. No.: 28,840

[22] Filed: Mar. 23, 1987

[51] Int. Cl.[4] .............................................. G01C 3/08
[52] U.S. Cl. ..................................... 356/28.5; 356/28
[58] Field of Search .............................. 356/28, 28.5, 5

[56] References Cited

U.S. PATENT DOCUMENTS

| | | | |
|---|---|---|---|
| 3,825,340 | 7/1974 | Debart | 356/28.5 X |
| 3,914,052 | 10/1975 | Wiklund | 356/5 |
| 3,915,572 | 10/1975 | Orloff | 356/28.5 |
| 3,984,685 | 10/1976 | Fletcher et al. | 356/28.5 X |
| 3,984,686 | 10/1976 | Fletcher et al. | 356/28 X |
| 4,167,329 | 9/1979 | Jelalian et al. | 356/285 X |
| 4,329,664 | 5/1983 | Javan | 332/7.51 |
| 4,466,738 | 8/1984 | Huang et al. | 356/28.5 X |
| 4,521,107 | 6/1985 | Chaborski et al. | 356/5 |
| 4,552,456 | 11/1985 | Endo | 356/28.5 X |
| 4,643,575 | 2/1987 | Hazeltine et al. | 356/28.5 X |

FOREIGN PATENT DOCUMENTS 2075787 11/1981 United Kingdom ............... 356/28.5

OTHER PUBLICATIONS

Malota, "Pulsed $CO_2$—Laser Heterodyne Radar for Simultaneous Measurements of Range and Velocity", Applied Optics, vol. 23, #19, 1984.

*Primary Examiner*—Thomas H. Tarcza
*Assistant Examiner*—Mark Hellner
*Attorney, Agent, or Firm*—Louis L. Dachs

[57] ABSTRACT

A laser doppler velocimeter system for wind shear detection comprising means for generating a beam of radiant energy, an optical system coupled to the beam for directing a first portion of the beam a predetermined distance to a scatterer of radiant energy, means coupled to the beam for conducting a second portion of the beam through a polarization preserving medium, the length of the medium substantially matching the predetermined distance, means for mixing the second portion of the beam with the radiant energy reflected by the scatterer and means coupled to the means for mixing for measuring a component of the velocity measurements of the scatterer. The velocity includes both horizontal and vertical components. The system may also be adapted for measurement of multiple predetermined distances by using multiple means for conducting a second portion of the beam, each of said multiple means having a length substantially matching one of the multiple predetermined distances. The beam of radiant energy used may be an infrared laser.

13 Claims, 1 Drawing Sheet

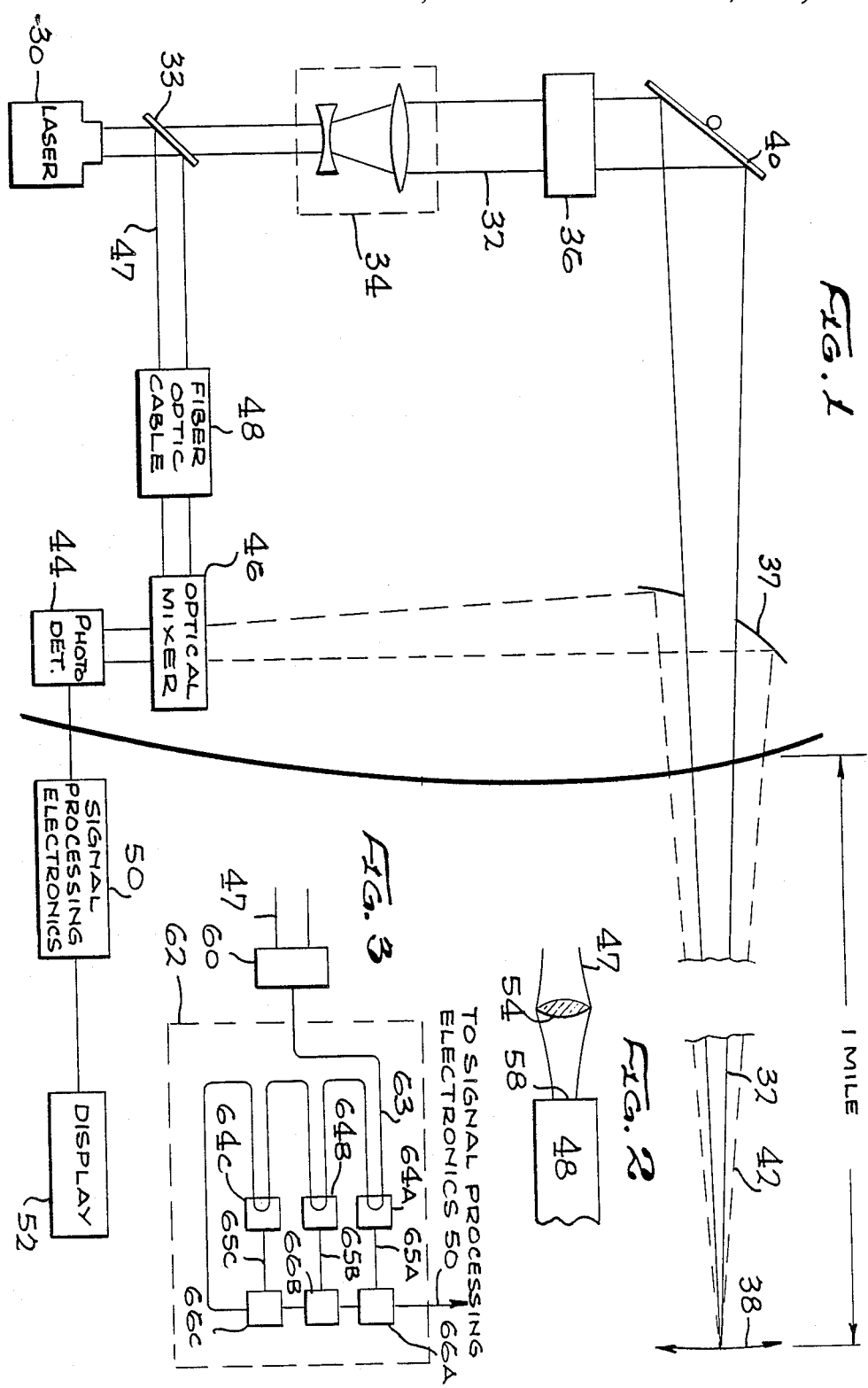

WIND SHEAR DETECTOR

TECHNICAL FIELD

The invention relates to laser doppler velocimeters and in particular to a laser doppler velocimeter for measuring wind velocity gradients such as wind shear.

BACKGROUND INFORMATION

Laser doppler velocimetry (LDV) in gases at long ranges has been a subject of investigation for nearly 20 years. Early velocity measurements were performed in large wind tunnels at distances of a few meters. Subsequent investigations included the measurement of meteorlogical parameters including wind velocity and turbulence, in part because of their importance to aircraft flight. By the early 1970's, laser doppler velocimeters were operating at ranges of hundreds of meters and, by the early 1980's, measurments were being made at kilometer ranges. These systems were quite large and were characterized by weights of thousands of pounds.

A typical long-range LDV for measuring wind shear includes a source of polarized radiation, which in current technology would be either A $CO_2$, YAG, or argon laser, for projecting a first coherent beam of light into a beam shaper. The beam shaper expands and collimates the beam after which the beam enters a telescope. The telescope projects the beam in nearly collimated form. A scanning mirror positioned after the telescope aims the beam at a point of interest. The beam strikes airborne particulates at the point of interest which results in a scattered beam. The scattered beam is received either by the telescope or a separate receiver telescope. The scattered beam is then directed to an optical mixer where it is mixed with a separate reference beam of light. Since the scattered beam is Doppler shifted by the relative velocity of the aircraft and the particulates, it has a slightly different frequency. When the scattered beam is mixed with the reference beam, the two are heterodyned producing a beat frequency, i.e., the Doppler frequency. The reference beam can be frequency shifted to adjust the location in the frequency domain of the Doppler signal to improve velocity resolution and simplify the processing of the signal. The optical mixer is coupled to a photodetector which produces an electrical signal proportional to the Doppler frequency, which may then be displayed.

The source of the reference beam is a major problem in this type of system. Originally, the reference beam is mutually coherent, i.e., in substantially phase identity, with the first beam. However, the reference beam becomes depolarized over time which results in significant error. To overcome this problem in some systems, the lasers are made with an extremely long coherence length and, therefore, one simply mixes a portion of the laser light split from the laser with the return wave to attain interference. Alternately, a second laser is used to generate the reference beam provided that it can be properly phase-locked to the laser source. Neither of these two methods has, however, proven practical. The detected heterodyne signal is typically very weak and noisy and requires amplification and filtering. In addition, the laser's relatively large size precludes its use on aircraft.

In U.S. Pat. No. 4,329,664 entitled "Generation of Stable Frequency Radiation at an Optical Frequency" by A. Javan, the accuracy of LDV systems is improved by correcting the error introduced by laser chirping. The system includes a power laser which produces optical radiation at a frequency that can fluctuate over a short interval, a reference laser for generating a modulation signal in the radio frequency range having frequency variations corresponding to the fluctuations of the power laser and a modulator for generating the desired stabilized optical radiation. Also, an optical delay in the form of mirrors is inserted between the power laser and the modulator to lengthen the optical path to correct the delay time introduced by laser chirping. However, there still exists significant error in the measurement of the wind velocity, because, despite the correction of power laser radiation, it still is not mutually coherent with the reference beam used to produce the heterodyned signal. Consequently, the heterodyned signal is very weak and noisy.

Therefore, it is an object of the present invention to produce a wind shear detection system using a laser for remote detection of a wind velocity gradient such as wind shear which eliminates the above-mentioned coherence limitation.

It is another object of the present invention to produce a wind velocity gradient detection system which is small enought to be considered for flight applications.

It is a further object of the present invention to produce a wind velocity gradient detection system which is capable of several different distance measurements.

DISCLOSURE OF THE INVENTION

A wind shear detection system is provided. The system comprises means for generating a beam of radiant energy, such as a laser, an optical system coupled to the beam for directing a first portion of the beam a predetermined distance to a scatterer of radiant energy, means coupled to the beam for conducting a second portion of the beam through a polarization preserving medium, the length of this medium substantially matching the predetermined distance, means for mixing the second portion of the beam with the radiant energy reflected by the scatterer and means, coupled to the means for mixing, for measuring at least one component of the velocity measurements of the scatterer. The components of the velocity may include either the horizontal or the vertical components. The system may also be adapted for measurement of multiple predetermined distances by using multiple means for conducting a second portion of the beam, each of such multiple means having a substantially matching one of the multiple predetermined distances. The beam of radiant energy used may be an infrared laser.

The novel features which are believed to be characeristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 shows a schematic representation of the present inventin.

FIG. 2 shows an optical coupler used in the present invention.

FIG. 3 shows a schematic representation of a system for providing multiple measurement of ranges.

BEST MODE FOR CARRYING OUT THE INVENTION

The present invention is shown schematically in FIG. 1. A source of polarized radiation 30, e.g., a frequency doubled YAG laser producing infrared radiation, projects a beam indicated by numeral 32 through a beam splitter 33 which is of a conventional type. The beam splitter 33 passes approximately 90% of the beam and reflects 10% as a reference beam 47. From the beam splitter 33 the beam 32 enters a beam shaper 34 which expands and collimates the beam 32 so that a greater atmospheric area is scanned by the beam at any given time. The beam 32 enters a transmitter telescope 36. The transmitter telescope 36 projects the light in a nearly collimated form. A scanning mirror 40, as described for example in U.S. Pat. No. 4,303,862 entitled "Clear Air Turbulence Detector" by Geiger, positioned after the transmitter telescope 36 causes the beam 32 to sweep out either a vertical or horizontal path at the point of interest 38. The beam 32 strikes airborne particulates at the point of interest 38 and produces a scattered beam 42. The scattered beam 42 is received by either a separate receiver 37 or in another configuration by the transmitter telescope 36. The receiver 37 projects the scattered beam 42 onto optical mixer 46 where the scattered beam 42 is mixed with reference beam 47 to produce a heterodyned signal. The optical mixer 46 is coupled to photodetector 44. The photodetector 44, which is conventional in nature, generates an electrical signal having an intensity proportional to the magnitude of the scattered beam 42. The signal from the photodetector 44 is manipulated by the signal processing electronics 50 to produce the horizontal and vertical local air velocity at the point of interest 38 which may represent potentially dangerous wind shear. The air velocity is represented on display 52.

As illustrated in FIG. 1 the point of interest 38 is indicated as one (1) mile from the aircraft. While the one (1) mile distance is appropriate for use in the detection of wind shear to provide sufficient warning to the pilot so he can make appropriate maneuvers to avoid it in other applications the point of interest 38 may lie closer or at a greater distance and thus, the one (1) mile is only for purposes of illustration.

As stated above, reference beam 47 is formed from a portion of the original beam 32 by beam splitter 33. Reference beam 47 is coupled to a single mode polarization preserving fiber optic cable 48 by a fiber optic coupler. A single mode polarization preserving fiber optic cable 54 suitable for this application is manufactured by York Limited, Chandlereford, England. In a typical single mode fiber, the fiber consists of two orthogonally polarized components. Since the fiber is not perfectly circularly symmetric, the two polarization components travel at different velocities. The difference is known as the intrinsic birefringence $S\beta$ of the fiber. As the linearly polarized light propagates down the fiber the two components become out of phase and the polarization state changes from linear to elliptical, then back to linear. The distance L over which the polarization rotates through a full 360° is known as a beat length where $$L = \frac{2\pi}{S\beta}$$

In a highly birefringent fiber, however, e.g., the single mode polarization preserving fiber optic cable 48, the difference between values of the orthogonally polarized modes is large. As a result, small pertubations such as bending cause no significant energy transfer between modes. When linearly polarized light e.g., reference beam 47, is launched into only one of the two modes, the output thus remains linearly polarized and the fiber is said to be polarization preserving. The length of single mode polarization preserving fiber optic cable 48 is selected to substantially match the operating range desired, for example, the distance to the point of interest 38. Consequently, beam 32 and reference beam 47 are mutually coherent. Hence, laser doppler velocimetry is no longer limited by lack of coherence of the radiation and can operate at ranges limited only by the detectability of the scattered beam 42. By using a number of single mode optical fibers of different lengths, multiple measurement ranges may be selected for almost simultaneous velocity measurements.

FIG. 2 shows the reference beam 47 being input into the single mode polarization preserving fiber optic cable 48. The standard prescription for launching the reference beam 47 into a single mode fiber optic cable 48 is by spot focussing the reference beam 47 using a fiber optic coupler 54 onto the fiber surface 58 so that the cone angle of the incident radiation does not exceed the numerical aperture NA of the single mode fiber optic cable 4°8. To maximize the coupling efficiency into the single mode fiber optic cable 48, the incident electromagnetic field distribution of the reference beam 47 is matched to that of the single mode fiber optic cable 48.

A system to measure multiple measurement ranges is shown in FIG. 3. Referring to FIGS. 2 and 3, it can be seen that the reference beam 47 is directed to a fiber optic coupler 60 (replaces fiber optic cable 48) which couples the beam 47 to a fiber optic cable assembly 62. The assembly 62 comprises a fiber optic cable 63 having numerous fiber optic couplers 64A-64C in series along its length. These couple fiber optic cables 65A-65C to a second set of fiber optic couplers 66A-66C connected in series further along the cable 63. Thus, it is clear that the location of the fiber optic couplers 64A-C correspond to discrete distances from the aircraft. The signal processing electronics 50 is used to select the length of cable 63 illustrated by measuring arrival times of the signals in order to measure the velocity gradient at a particular distance from the aircraft.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The wind shear detector system is useful wherever wind velocity gradients must be measured and in particular on board an aircraft for measuring wind shear at substantial distances.

We claim:

1. A wind velocity gradient detection system comprising:
   means for generating a beam of radiant energy;
   an optical system coupled to said beam for directing a first portion of said beam over multiple predetermined distances to a scatterer of radiant energy;
   multiple means coupled to said beam for conducting a second portion of said beam through a polarization medium, each of said multiple means having a length substantially matching one of said multiple predetermined distances;
   means for mixing said second portion with said radiant energy reflected by said scatterer; and
   means coupled to said means for mixing for measuring a component of the velocity of said scatterer.

2. The wind velocity gradient detection system of claim 1 wherein said beam of radiant energy is a laser.

3. The wind velocity gradient system of claim 1 wherein a display means is coupled to said means for measuring.

4. The wind velocity gradient system of claim 1 wherein the vertical component of the velocity of said scatterer is measured.

5. The wind velocity gradient system of claim 1 wherein the horizontal component of the velocity of said scatterer is measured.

6. The wind velocity gradient system of claim 2 wherein said laser is an infrared laser.

7. A wind velocity gradient system comprising:
   means for generating a beam of radiant energy;
   an optical system coupled to said beam for directing a first portion of said beam a predetermined distance to a scatterer of radiant energy;
   a single mode polarization preserving fiber optic cable coupled to said beam for conducting a second portion of said beam, the length of said cable matching said predetermined distance;
   means for mixing said second portion with said radiant energy reflected by said scatterer; and
   means coupled to said means for mixing for measuring a component of the velocity of said scatterer.

8. The wind velocity gradient system of claim 7 wherein said beam of radiant energy is a laser.

9. The wind velocity gradient system of claim 7 wherein there exists multiple predetermined distances and multiple single mode fiber optic cables for conducting a second portion of said beam, each of said cables having a length matching one of said multiple predetermined distances.

10. The wind velocity gradient system of claim 7 wherein a display means is coupled to said means for measuring.

11. The wind velocity gradient system of claim 7 wherein the vertical component of the velocity of said scatterer is measured.

12. The wind velocity gradient system of claim 7 wherein the horizontal component of the velocity of said scatterer is measured.

13. The wind velocity gradient system of claim 8 wherein said laser is an infrared laser.

* * * * *